United States Patent [19]

Ho

[11] 4,322,291
[45] Mar. 30, 1982

[54] WATER-DISPENSERS

[76] Inventor: Kuo-Sheng Ho, No. 48, Chiu Ting Rd., Kaohsiung, Taiwan

[21] Appl. No.: 179,470

[22] Filed: Aug. 19, 1980

[51] Int. Cl.³ .......................................... B01D 35/00
[52] U.S. Cl. ................................. 210/181; 210/287; 210/424; 250/438; 422/24
[58] Field of Search ................ 137/625.29; 210/663, 210/668, 669, 764, 181, 278, 287, 288, 418, 420, 422, 424, 443, 501; 250/435, 436, 438, 455; 422/24

[56] References Cited

U.S. PATENT DOCUMENTS

| | | | |
|---|---|---|---|
| 550,939 | 12/1895 | Blessing | 137/625.29 |
| 984,552 | 2/1911 | Gambati | 210/181 |
| 2,038,171 | 4/1936 | Gudmundsen | 210/501 |
| 3,870,033 | 3/1975 | Faylor et al. | 210/669 |
| 4,255,383 | 3/1981 | Schenck | 422/24 |

*Primary Examiner*—Ivars C. Cintins
*Attorney, Agent, or Firm*—Holman & Stern

[57] ABSTRACT

A water dispenser provided with a synchronous supply water valve system to control the simultaneous flow of water into and from the dispenser and further provided with a water purifier and an ultraviolet tank to provide purified and sterilized water for use.

8 Claims, 6 Drawing Figures

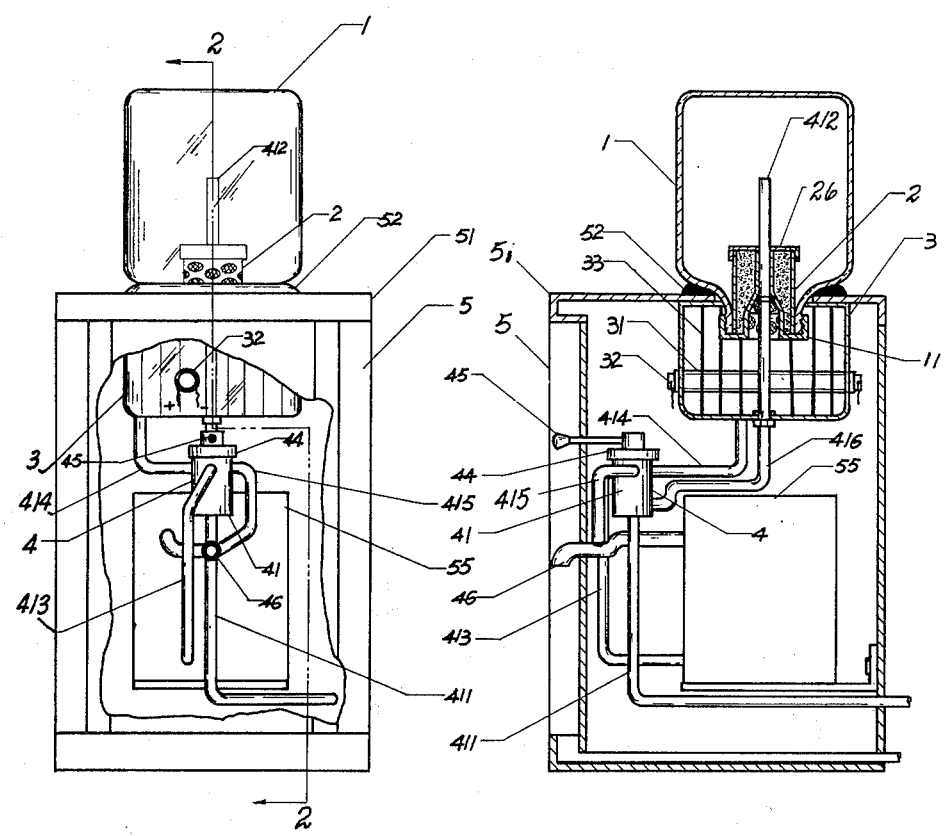

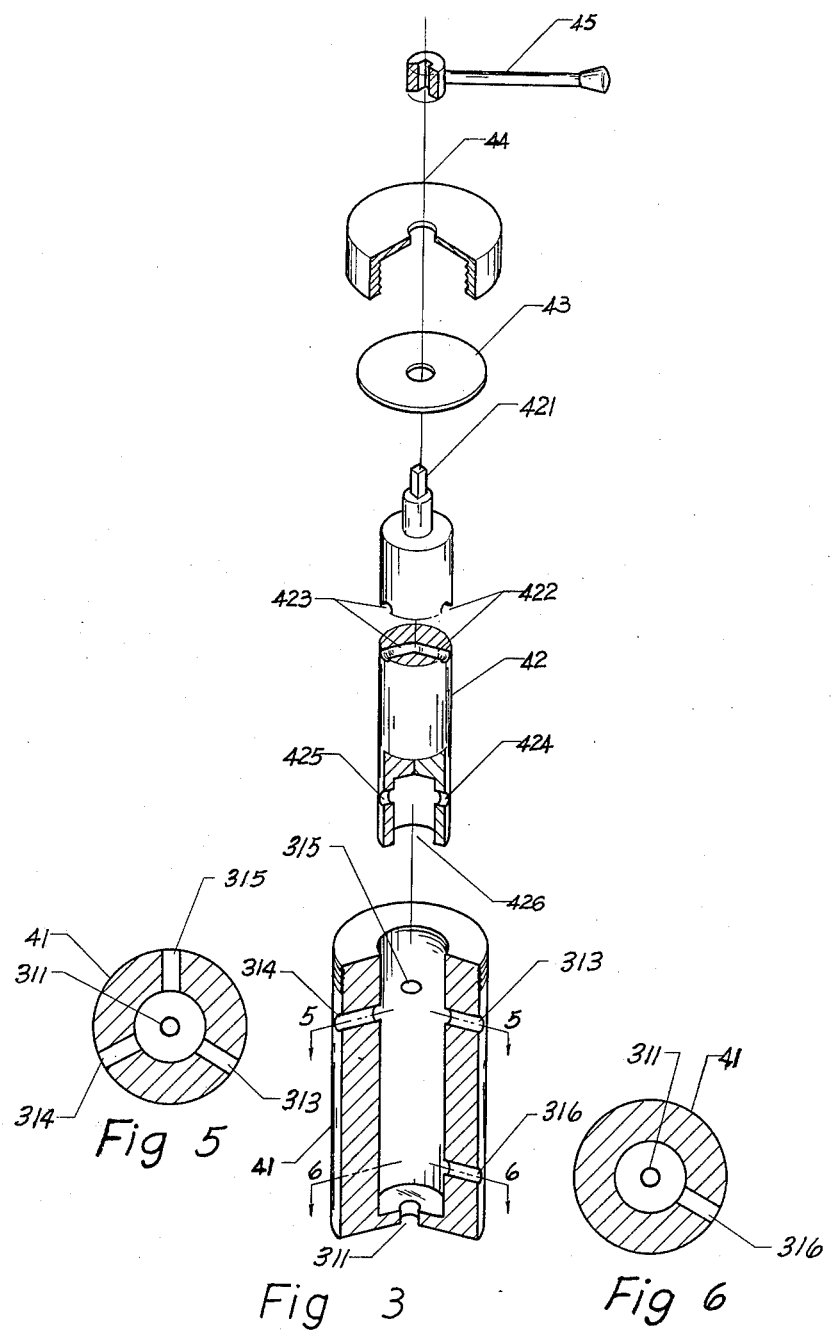

WATER-DISPENSERS

BACKGROUND OF THE INVENTION

This invention relates to an improved water dispenser provided with a synchronous water supply valve to control the simultaneous flow of water into and from the dispenser. In operation, the water, which is supplied from a water source, enters the dispenser through an inlet means and is fed to a container where it descends through a water purification tank and an ultraviolet tank which purifies and sterilizes it. The water then returns through a two way valve of the synchronous valve system to supply, upon demand, cold or hot water, the cold water flowing directly from outlet. If hot water is desired, by appropriate positioning of the two way valve water is directed to a heating tank to heat and supply water through the water outlet.

Conventional water dispensers, as is widely known, are usually filled manually. This is inconvenient, and when there is insufficient water in the system the heater may be damaged. In addition, conventional water dispensers have several valves to control the flow supply of cold or hot water. This results in a waste of valuable material. Furthermore, conventional water dispensers lack the filtering and ultraviolet sterilization means of the present invention, and the water provided by them is, therefore, less sanitary.

Having reviewed the above-mentioned defects in conventional water dispensers, the inventor discloses below the improvements in a water dispenser which comprises his invention.

BRIEF DESCRIPTION OF THE INVENTION

The present invention relates to improvements in a water dispenser which is provided with a water purifier, an ultraviolet tank to purify and sterilize water for use and a synchronous valve system, i.e. a two-way valve which allows the simultaneous flow of water into and from the dispenser and permits cold or hot water to be supplied as needed.

One object of the invention is to provide a synchronous valve system which permits the simultaneous flow of water into and from the dispenser.

Another object of the invention is to provide a container which can also be disassembled to permit manual filling of the dispenser.

Another object of the invention is to provide a water purifier which employs a filter material, such as activated carbon, resin . . . etc., to improve water quality.

Another object of the invention is to provide an ultraviolet lamp which is installed in the water tank to rapidly sterilize the water contained therein.

BRIEF DESCRIPTION OF THE DRAWING

The present invention may be described with greater clarity and specificity with reference to the following drawings:

FIG. 1 is front view of the dispenser;

FIG. 2 is side view of the dispenser shown in FIG. 1 taken along line 2—2;

FIG. 3 is perspective view of the synchronous valve system;

FIG. 5 is a cross-section of the cylindrical body shown in FIG. 3, taken along line 5—5;

FIG. 6 is a cross-sectional view of the cylindrical body shown in FIG. 3, taken along line 6—6;

DESCRIPTION OF PREFERRED EMBODIMENT OF THE INVENTION

Figure 4:
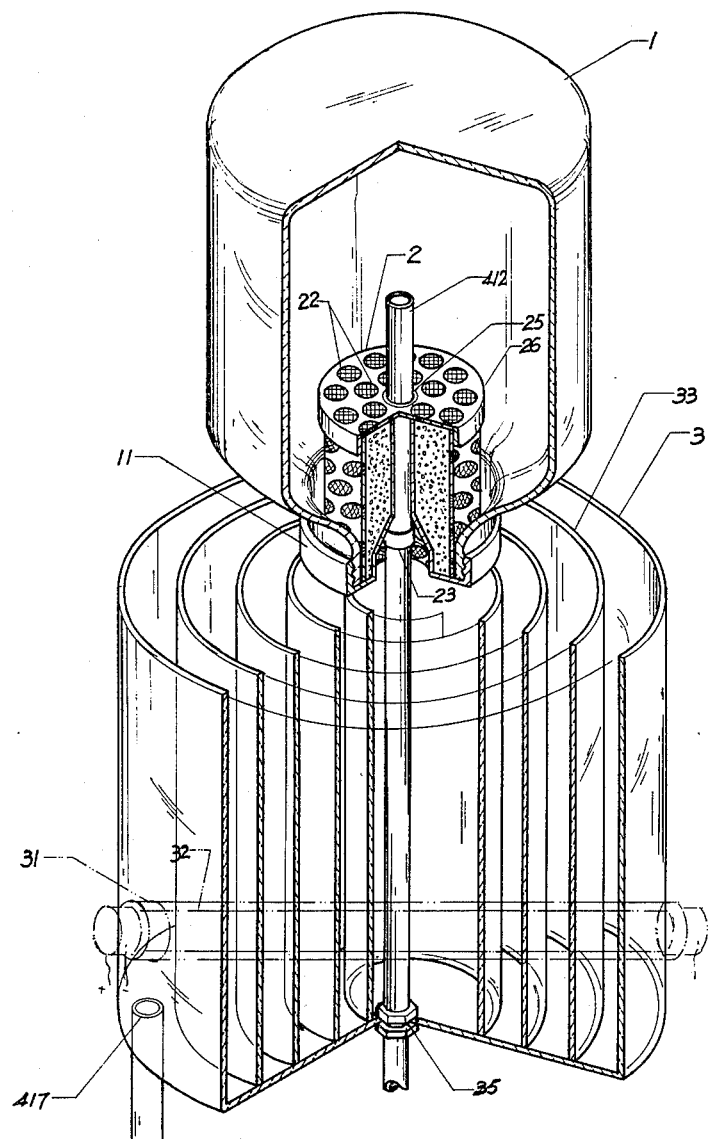
FIG. 4 is a cross-sectional view of the water purifier and ultraviolet tank.

The present invention comprises water container 1, water purifier 2, ultraviolet tank 3, synchronous valve system 4.

Water container 1 is installed in the top of the dispenser 5, such that an external thread on a neck portion of the container engages an internal thread in collar 11 which is located in the upper portion of the dispenser and within ultraviolet tank 3. The water purifier 2, located inside container 1 at its neck portion, is a cylindrical unit, having several openings in its peripheral and upper surfaces, the cylindrical unit also being provided with a filter net or screen 22. The cylindrical water purification unit is covered by top cover 26, and filled with filter material, such as, activated carbon, resin, etc. The water purification unit has an axial hole 25 at its center which flares out to a larger diameter at its lower end. The axial hole 25 accepts inlet pipe 412, which is joined to pipe 416. The axial tapered hole 25 and inlet pipe 412 have a packing ring 23, positioned therebetween substantially where the axial hole flares out, to prevent the water from seeping down between the gap which exists between the flared portion of axial hole 25 and inlet pipe 412.

The bottom or neck portion of the water container 1 is inserted through cover 51 and packing 52 into ultraviolet tank 3. The ultraviolet tank 3 is provided with a series of transparent, concentric plates 33 (see FIG. 4) their function being to effect a uniform water flow. The center portion of the tank 3 is provided with a transparent protecting tube 31, within which is located an ultraviolet lamp (emitting light at about 2537 Å) which serves to sterilize the water instantly. At the bottom of the tank 3 is located a water outlet 417 connected by means of pipe 414 to synchronous valve system 4.

Referring to FIG. 3, the synchronous valve system 4 comprises cylindrical body 41, rotating plug 42, washer 43, cover 44 and handle 45. The cylindrical body has in its upper portion three radially extending apertures, formed in a plane, at angles of 120 degrees with respect to one another: outlet to the hot water heater 313, purified water inlet 314 and purified water outlet 315. The cylindrical body also has a radially extending aperture 316, located at its lower end, which is connected to pipe 416, and in the bottom of the cylindrical body 41 is located an axial aperture 311 which receives pipe 411 which in turn is connected to the source of water. At the top portion of the rotating plug 42 there are two radially extending, interconnected apertures, 422 and 423, which form an angle of 120 degrees with respect to each other. In the bottom of the rotating plug there is a recess 426 and two openings 424 and 425, which extend radially through the wall of the plug and into the recess 426. The rotating plug 42 can be assembled with the washer 43, cover 44 and handle 45, so that in operation the rotating plug 42 is turned by handle 45.

In operation, the aforedescribed synchronous valve systen 4 is assembled by conventional technique. When the handle 45 is rotated clockwise, the rotating plug 42 may be positioned so that the interconnected aperture 422-423 communicates with apertures 314 and 315 of the cylindrical body 41 respectively, and the aperture 424 of the plug 42 communicates with aperture 316. Thus, the water from its source can flow through water pipe 411 into the inlet 311, recess 426, apertures 424 and 316, pipe 416 and inlet pipe 412 into the container 1. The water then descends through water purifier 2 into the ultraviolet tank 3, exiting therefrom through water outlet 417, pipe 414 and plug aperture 314, then flowing through interconnected apertures 422 and 423 into water outlet aperture 315, water outlet pipe 415 and finally into water outlet 46 for use.

Furthermore, when the handle 45 is rotated counter-clockwise, the rotating plug 42 is turned to permit interconnected apertures 422, 423 to communicate with apertures 313 and 314 of the cylindrical body 41 respectively, and plug aperture 425 communicates with aperture 316. Thus, the water from its source can flow through water pipe 411, aperture 311, recess 426, plug aperture 425, aperture 316, pipe 416 and inlet pipe 412 into the container 1. The water then descends through water purifier 2 into the ultraviolet tank 3, exiting therefrom through the water outlet 417, pipe 414 and plug aperture 314, interconnected apertures 422 and 423 into hot water outlet aperture 313 and outlet pipe 413 to heating tank 55 which provides hot water, ready for use, through faucet 46.

When the handle 45 is positioned between the full clockwise and full counter-clockwise positions, the plug aperture 422 is positioned between apertures 314 and 313, and aperture 416 is positioned intermediate plug apertures 424 and 425. Thus, the synchronous valve system is in the closed position.

What is claimed is:

1. A water dispenser which provides purified water upon demand comprising:
    a synchronous valve having a plurality of inlet and outlet apertures which simultaneously receives unpurified water from a water source and dispenses purified water;
    a first conduit for conveying the unpurified water from the water source to said synchronous valve;
    a water purification means, said purification means comprising a water reservoir, a water filtering means placed within said water reservoir and communicating with an ultraviolet tank, said tank comprising a plurality of concentric transparent plates and an ultraviolet lamp placed within said tank;
    a second conduit for conveying unpurified water from said synchronous valve to said water purification means;
    a third conduit for conveying purified water from said water purification means back to said synchronous valve; and
    a fourth conduit for conveying purified water from said synchronous valve to a water outlet.

2. The water dispenser of claim 1, wherein a fifth conduit is operatively connected to said synchronous valve to convey purified water from said synchronous valve to a hot water heater which dispenses purified hot water through said outlet, and a flow control means is incorporated within said synchronous valve, whereby purified water may be directed to said fifth conduit or said fourth conduit.

3. The water dispenser of claim 2, wherein said synchronous valve comprises a cylindrical body having an axial cylindrical chamber therein; an axial aperture in the bottom of said cylindrical body communicating with said chamber, said axial aperture being connected to said first conduit means; a first radial aperture located in the lower portion of said cylindrical body communicating with said chamber, said first radial aperture connected to said second conduit means, a set of three coplanar apertures located in the upper portion of said cylindrical body radially extending at angles of 120 degrees with respect to each other and communicating with said chamber, the first of said set of three coplanar apertures connected to said third conduit means, the second of said set of three coplanar apertures connected to said fourth conduit means and the third of said set of coplanar apertures connected to said fifth conduit means; a cylindrical rotating plug positioned within and rotatable within said chamber, said cylindrical rotating plug having a cavity in its bottom portion, a first set of two coplanar radially extending apertures communicating with said cavity and positioned with respect to each other at an angle of 120 degrees, a second set of two coplanar apertures interconnected with one another and at an angle of 120 degrees in the upper portion of said cylindrical rotating plug, and a shaft extending axially from the upper portion of said cylindrical rotating plug; a washer positioned over said cylindrical rotating plug so that the shaft passes through said washer; a cover having a hole at its center to allow the shaft to extend therefrom and means for attaching said cover to said cylindrical body; and a handle mountable on said shaft.

4. The water dispenser of claim 1, wherein said water filtering means comprises a perforated recepticle and a screen and a member selected from the group consisting of activated carbon and a resin within said receptacle.

5. The water dispenser of claim 1, wherein said ultraviolet lamp is positioned radially within said ultraviolet tank.

6. The water dispenser of claim 1, wherein said ultraviolet tank is provided with a transparent protecting tube within which said ultraviolet lamp is placed.

7. The water dispenser of claim 1, wherein said ultraviolet lamp emits light at about 2537 Å.

8. A water dispenser which provides purified water upon demand comprising:
    a synchronous valve having a plurality of inlet and outlet apertures which simultaneously receives unpurified water from a water source and dispenses purified water;
    a first conduit for conveying the unpurified water from the water source to said synchronous valve;
    a water purification means;
    a second conduit for conveying unpurified water from said synchronous valve to said water purification means;
    a third conduit for conveying purified water from said water purification means back to said synchronous valve;
    a fourth conduit for conveying purified water from said synchronous valve to a water outlet; and
    a fifth conduit operatively connected to said synchronous valve to convey purified water from said synchronous valve to a hot water heater which dispenses purified hot water through said outlet, and a flow control means incorporated within said synchronous valve, whereby purified water may be directed to said fifth conduit or said fourth conduit;
    wherein said synchronous valve comprises a cylindrical body having an axial cylindrical chamber therein, an axial aperture in the bottom of said cylindrical body communicating with said chamber, said axial aperture being connected to said first conduit means, a first radial aperture located in the lower portion of said cylindrical body communicating with said chamber, said first radial aperture connected to said second conduit means, a set of three coplanar apertures located in the upper portion of said cylindrical body radially extending at angles of 120 degrees with respect to each other and communicating with said chamber, the first of said set of three coplanar apertures connected to said third conduit means, the second of said set of three coplanar apertures connected to said fourth conduit means and the third of said set of coplanar apertures connected to said fifth conduit means; a cylindrical rotating plug positioned within and rotatable within said chamber, said cylindrical rotating plug having a cavity in its bottom portion, a first set of two coplanar radially extending apertures communicating with said cavity and positioned with respect to each other at an angle of 120 degrees, a second set of two coplanar apertures interconnected with one another and at an angle of 120 degrees in the upper portion of said cylindrical rotating plug, and a shaft extending axially from the upper portion of said cylindrical rotating plug, a washer positioned over said cylindrical rotating plug so that the shaft passes through said washer, a cover having a hole at its center to allow the shaft to extend therefrom and means for attaching said cover to said cylindrical body, and a handle mountable on said shaft.

* * * * *